(12) United States Patent
Li et al.

(10) Patent No.: US 10,130,941 B2
(45) Date of Patent: Nov. 20, 2018

(54) METHODS, SYSTEMS AND CATALYSTS FOR OXIDIZING CARBON MONOXIDE TO CARBON DIOXIDE

(71) Applicant: EAST CHINA UNIVERSITY OF SCIENCE AND TECHNOLOGY, Shanghai (CN)

(72) Inventors: Liang Li, Shanghai (CN); Gengnan Li, Shanghai (CN)

(73) Assignee: EAST CHINA UNIVERSITY OF SCIENCE AND TECHNOLOGY, Shanghai (CN)

(*) Notice: Subject to any disclaimer, the term of this patent is extended or adjusted under 35 U.S.C. 154(b) by 0 days.

(21) Appl. No.: 15/117,426

(22) PCT Filed: Feb. 7, 2014

(86) PCT No.: PCT/CN2014/071883
§ 371 (c)(1),
(2) Date: Aug. 8, 2016

(87) PCT Pub. No.: WO2015/117269
PCT Pub. Date: Aug. 13, 2015

(65) Prior Publication Data
US 2017/0001175 A1    Jan. 5, 2017

(51) Int. Cl.
*B01J 23/656* (2006.01)
*B01D 53/86* (2006.01)
*B01J 37/03* (2006.01)
*B01J 37/06* (2006.01)
*B01J 37/16* (2006.01)
*B01J 35/00* (2006.01)
*B01J 35/10* (2006.01)
*B01D 53/88* (2006.01)
*B01J 37/04* (2006.01)
*B01J 37/08* (2006.01)
*H01M 8/0668* (2016.01)

(52) U.S. Cl.
CPC ........ *B01J 23/6562* (2013.01); *B01D 53/864* (2013.01); *B01D 53/88* (2013.01); *B01J 35/0013* (2013.01); *B01J 35/1014* (2013.01); *B01J 35/1019* (2013.01); *B01J 35/1038* (2013.01); *B01J 35/1042* (2013.01); *B01J 35/1057* (2013.01); *B01J 35/1061* (2013.01); *B01J 37/031* (2013.01); *B01J 37/035* (2013.01); *B01J 37/036* (2013.01); *B01J 37/04* (2013.01); *B01J 37/06* (2013.01); *B01J 37/08* (2013.01); *B01J 37/16* (2013.01); *B01D 2255/1023* (2013.01); *B01D 2255/2073* (2013.01); *B01D 2255/92* (2013.01); *B01D 2255/9207* (2013.01); *B01D 2257/502* (2013.01); *C01B 2203/044* (2013.01); *C01B 2203/047* (2013.01); *C01B 2203/066* (2013.01); *H01M 8/0668* (2013.01)

(58) Field of Classification Search
None
See application file for complete search history.

(56) References Cited

U.S. PATENT DOCUMENTS

| | | | | | |
|---|---|---|---|---|---|
| 4,003,979 | A | * | 1/1977 | Kanno | A62B 21/00 423/213.5 |
| 4,620,508 | A | * | 11/1986 | Fligner | B01J 4/008 122/7 D |
| 6,517,803 | B2 | * | 2/2003 | Manev | C01G 45/02 252/518.1 |
| 6,548,445 | B1 | * | 4/2003 | Buysch | B01J 23/56 502/230 |
| 7,678,734 | B2 | | 3/2010 | Chigapov et al. | |
| 2010/0008840 | A1 | * | 1/2010 | Zhong | B01D 53/864 423/247 |
| 2013/0195750 | A1 | * | 8/2013 | Koyanaka | B01J 23/6562 423/651 |
| 2014/0219878 | A1 | * | 8/2014 | Mccool | F01N 3/2066 422/168 |

FOREIGN PATENT DOCUMENTS

| | | |
|---|---|---|
| CN | 101611927 A | 12/2009 |
| CN | 101618350 A | 1/2010 |
| EP | 1238703 A2 | 9/2002 |
| JP | 2004230223 * | 8/2004 |
| WO | 9101175 A1 | 2/1991 |
| WO | 2006037610 A1 | 4/2006 |

OTHER PUBLICATIONS

Zhang, et al. "Shape Controlled Synthesis . . . ". Nano Res. 3: 235-243 (2010).*
Glaspell et al., Nanocatalysis on Supported Oxides for CO Oxidation, Topics in Catalysis (Feb. 5, 2008), 47(1) pp. 22-31.
International Search Report and Written Opinion for International Application No. PCT/CN2014/071883 dated Nov. 6, 2014, pp. 8.
Jin et al., Low temperature CO oxidation over Pd catalysts supported on highly ordered mesoporous metal oxides, Catalysis Today (May 20, 2012), 185(1) pp. 183-190.
Wang et al., Gold nanoparticles supported on manganese oxides for low-temperature CO oxidation, Applied Catalysis B: Environmental (Apr. 29, 2009), 88(1-2) pp. 204-212.

* cited by examiner

*Primary Examiner* — Sheng H Davis (57) ABSTRACT

Methods and catalyst compositions for oxidizing CO to $CO_2$ at low temperatures are disclosed. In one embodiment, a method of oxidizing CO to $CO_2$ may involve heating a gaseous mixture comprising at least CO and $O_2$ with a catalyst mixture comprising Pd disposed on a $Mn_3O_4$ mesoporous support at a temperature of about 0° C. to about 60° C., and wherein the CO to $CO_2$ conversion rate is about 40% to about 100%.

19 Claims, 8 Drawing Sheets

METHODS, SYSTEMS AND CATALYSTS FOR OXIDIZING CARBON MONOXIDE TO CARBON DIOXIDE

CROSS-REFERENCE TO RELATED APPLICATIONS

The present application is a U.S. National Stage filing under 35 U.S.C. § 371 of International Patent Application No. PCT/US2014/071883, filed on Feb. 7, 2014, and entitled "METHODS, SYSTEMS AND CATALYSTS FOR OXIDIZING CARBON MONOXIDE TO CARBON DIOXIDE," which is incorporated herein by reference in its entirety.

BACKGROUND

Over the past decade, the development of catalysts to oxidize carbon monoxide (CO) at low temperatures has become an important research topic due to their wider applications in industrial and environmental fields, such as proton exchange membrane fuel cells, automobile emissions, and CO gas detection in indoor air. One important application is to control CO in gas streams for use in proton exchange membrane (PEM) fuel cells and other fuel cells. Most fuel cells suffer from the poisoning f electrodes by carbon monoxide if carbon monoxide concentration exceeds 20 ppm limit. Thus, there is a need to remove carbon monoxide from hydrogen-containing feed-gas mixture using catalysts that operate at low temperatures. Further, most CO oxidation applications involve a moist environment with rapid flow rates. Therefore, there is a need to develop moisture tolerant catalysts that can oxidize CO at low temperatures.

SUMMARY

The current disclosure provides methods to oxidize CO to $CO_2$ at low temperatures. In one embodiment, a method of oxidizing CO to $CO_2$ may involve heating a gaseous mixture comprising at least CO and $O_2$ with a catalyst mixture comprising at least: Pd and $Mn_3O_4$ at a temperature of about 0° C. to about 60° C., and wherein the CO to $CO_2$ conversion rate is about 40% to about 100%.

In another embodiment, a method of making a Pd/$Mn_3O_4$ catalyst may involve contacting $Mn_3O_4$ with a Pd compound to form a reaction mixture, contacting the reaction mixture with a reducing agent to form a precipitate, and isolating the precipitate.

In a further embodiment, a Pd/$Mn_3O_4$ catalyst comprises a mesoporous $Mn_3O_4$ support, and at least one Pd nanoparticle disposed on at least a portion of the mesoporous $Mn_3O_4$ support, wherein the Pd is present in the Pd/$Mn_3O_4$ catalyst in an amount of about 1 weight percent to about 5 weight percent.

In an additional embodiment, a system for oxidizing CO to $CO_2$ may include a gas source configured to supply a gaseous mixture, and a reactor configured to contain a volume of catalyst, wherein the catalyst comprises at least Pd and $Mn_3O_4$. The reactor further includes an inlet configured to receive the gaseous mixture such that the gaseous mixture passes through the volume of catalyst, and an outlet configured to allow gaseous mixture that has passed through the volume of catalyst to exit the reactor. Further, the reactor is configured to convert CO to $CO_2$ at a rate of about 40% to about 100% when heated to a temperature of about 0° C. to about 60° C.

BRIEF DESCRIPTION OF THE FIGURES

FIG. 2A shows CO conversion rates of various catalytic mixtures. The x-axis is temperature in ° C. and the y-axis is CO conversion in percent. The round symbols represent sample $MP_0$, the square symbols represent sample $MP_1$, the pointing up triangle symbols represent sample MP1, and the pointing down triangle symbols represent sample $MP_3$. FIG. 2B shows CO conversion rate of MP2 at 5° C. (square symbols) and 60° C. (round symbols), The x-axis is time in hours, and the y-axis is CO conversion in percent.

DETAILED DESCRIPTION

This disclosure is not limited to the particular systems, devices and methods described, as these may vary. The terminology used in the description is for the purpose of describing the particular versions or embodiments only, and is not intended to limit the scope.

The present disclosure provides catalyst compositions and methods to oxidize CO to $CO_2$ at low temperatures. The catalyst employed is a Pd catalyst supported on a mesoporous $Mn_3O_4$ support, The mesoporous $Mn_3O_4$ support disclosed herein are economical to manufacture, with simple processes. Further, $Mn_3O_4$ has high mechanical strength and abrasion resistance at any temperature at which it serves for CO oxidation.

In some embodiments, the mesoporous $Mn_3O_4$ support may be produced by mixing a triblock copolymer, a manganese salt, and a solvent to form a solution, heating the solution to form a product, and calcining the product. Non-limiting examples of manganese salt include $Mn(NO_3)_2$, $MnCl_2$, $MnBr_2$, $MnF_2$, $MnPO_4$, $MnSO_4$, or any combination thereof. Examples of triblock polymers that may be used include, but are not limited to, poly(ethyleneglycol)-poly(propyleneglycol)-poly(ethyleneglyeol), poly(ethyleneimine,)-poly(ethyleneglyeol)-poly(ethyleneimine), poly(ethyleneglycol)-polyacetal-poly(ethyleneglycol), polyacetal-poly(ethyleneglycol)-polyacetal, or any combinations thereof.

In some embodiments, the manganese salt and the triblock polymer are mixed with a solvent, such as ethanol, propanol, ether, acetone, ethyl acetate, water, dimethylformamide, or any combination thereof. Mixing may be performed by any method known in the art. Suitable time periods for this mixing process may include from about 30 minutes to about 2 hours, about 30 minutes to about 1.5 hours, about 30 minutes to about 1 hour, or about 30 minutes to about 45 minutes. Specific examples include about 30 minutes, about 45 minutes, about 1 hour, about 1.25 hours, about 1.5 hours, about 2 hours, and ranges between any two of these values (including their endpoints). In some cases, longer periods of times may be used After the mixing step, the solution is evaporated. This step may be performed by any known process in the art, such as heating, rotary evaporation, air drying, or evaporating in an oven until the solution is substantially evaporated. For example, the solution may be heated to about 50° C. to about 80° C. about 50° C. to about 70° C., about 50° C. to about 60° C., or about 50° C. to about 55° C. Specific examples include about 50° C., about 55° C., about 60° C., about 70° C., about 80° C., and ranges between any two of these values. Suitable time periods for this evaporation step may include about 24 hours to about 96 hours, about 24 hours to about 72 hours, about 24 hours to about 48 hours, or about 24 hours to about 36 hours. Specific examples include about 24 hours, about 48 hours, about 60 hours, about 72 hours, about 96 hours, and ranges between any two of these values (including their endpoints). The product obtained by these processes may be a xerogel.

In some embodiments, the product obtained after solvent evaporation is further calcined generally at about 300° C. to about 600° C., for about 30 minutes to about 6 hours, about 30 minutes to about 5 hours, about 30 minutes to about 3 hour, or about 30 minutes to about 2 minutes. Specific examples include about 30 minutes, about 45 minutes, about 2 hour, about 4 hours, about 5 hours, about 6 hours, and ranges between any two of these values (including their endpoints). Calcination refers to a process of heating a substance to a high temperature but below the melting or fusing point, and may cause loss of moisture, reduction and/or oxidation. This process may be performed by any known methods in the art, such as using furnaces, rotary kilns, fluidized bed actors, and the like. The shape and the size of the $Mn_3O_4$ mesoporous support thus produced are not specifically defined. The support may have any desired shape and structure, for example, the support may be in any form of powders, spheres, granules, honeycombs, and the like, or combinations thereof.

For applying palladium to the mesoporous support, the steps may include contacting the $Mn_3O_4$ mesoporous support, with a palladium compound to form a reaction mixture, contacting the reaction mixture with a reducing agent to form a precipitate, and isolating the precipitate. Non-limiting examples of palladium compound include $Na_2PdCl_4$, $H_2PdCl_4$, $K_2PdCl_4$, $(NH_4)_2PdCl_4$, $Pd(CH_3COO)_2$, $Pd(NO_3)_2$, $PdSO_4$, or any combination thereof. The palladium solution may be applied to the $Mn_3O_4$ mesoporous support in any ordinary method of mixing, dipping, co-precipitation, or competitive adsorption. The conditions for the treatment may be suitably selected, depending on the method employed. In some embodiments, the $Mn_3O_4$ mesoporous support is mixed with the Pd compound for about 1 hour to about 3 hours, about 1 hour to about 2 hours, or about 1 hour to about 1.5 hours. Specific examples include about 1 hour, about 1.25 hours, about 1.5 hours, about 2 hours, about 3 hours, and ranges between any two of these values (including their endpoints). In some embodiments, the $Mn_3O_4$ mesoporous support may be kept in contact with the palladium solution at a temperature between room temperature and 90° C., for about 1 minute to about 10 hours.

In some embodiments, a reducing agent may be added to the above described $Mn_3O_4$—Pd reaction mixture to precipitate the $Pd/Mn_3O_4$ catalyst. Suitable reducing agents that may be used are hydrazine, $NaBH_4$, $KBH_4$, or any combination thereof. Suitable time periods for mixing this reducing agent and $Mn_3O_4$-Pd mixture may be about 8 hours to about 24 hours, about 8 hours to about 20 hours, about 8 hours to about 16 hours, or about 8 hours to about 12 hours. Specific examples include about 8 hours, about 12 hours, about 16 hours, about 20 hours, about 24 hours, and ranges between any two of these values (including their endpoints). The precipitate obtained may be isolated by any known process in the art, such as centrifugation, filtration, distillation, decantation, or any combination thereof. The precipitate is further washed and dried by rotary evaporation or air drying, or by any other similar process.

Disclosed herein are catalyst compositions that may be used for oxidizing CO to $CO_2$. In some embodiments, a $PdMn_3O_4$ catalyst made by the steps described herein may comprise a mesoporous $Mn_3O_4$ support, and at least one Pd nanoparticle disposed on at least a portion of the mesoporous $Mn_3O_4$ support, wherein the Pd is present in the $Pd/Mn_3O_4$ catalyst in an amount of about 1 weight percent to about 5 weight percent. In some embodiments, the amount of Pd nanoparticle in the catalyst may be in the range of about 1 weight percent to about 5 weight percent, about 1 weight percent to about 4 weight percent, about 1 weight percent to about 3 weight percent, or about 1 weight percent to about 2 weight percent of the catalyst. Specific examples include about 1 weight percent, about 1.5 weight percent, about 2.5 weight percent, about 3 weight percent, about 4 weight percent, about 5 weight percent, and ranges between any two of these values (including their endpoints).

In some embodiments, the $Mn_3O_4$ mesoporous support may have a disordered or ordered pore structure. In some embodiments, $Mn_3O_4$ mesoporous support has an average pore diameter of about 1 nanometer to about 50 nanometers, about 1 nanometer to about 40 nanometers, about 1 nanometer to about 25 nanometers, or about 1 nanometer to about 10 nanometers. Specific examples include about 1 nanometer, about 5 nanometers, about 15 nanometers, about 25 nanometers, about 50 nanometers, and ranges between any two of these values (including their endpoints).

In some embodiments, the $Mn_3O_4$ mesoporous support has an average pore volume of about 0.2 $cm^3$/gram to about 1 $cm^3$/gram, about 0.2 $cm^3$/gram to about 0.8 $cm^3$/gram, about 0.2 $cm^3$/gram to about 0.6 $cm^3$/gram, about 0.2 cm³/gram to about 0.5 cm³/gram, or about 0.2 cm³/gram to about 0.3 cm³/gram. Specific examples include about 0.2 cm³/gram, about 0.4 cm³/gram, about 0.6 cm³/gram, about 0.8 cm³/gram, about 1 cm³/gram, and ranges between any two of these values including their endpoints In some embodiments, the $Mn_3O_4$ mesoporous support has an average BET (Brunauer-Emmett-Teller) surface area of about 60 m²/gram to about 150 m²/gram, about 60 m²/gram to about 120 m²/gram to about 60 m²/gram to about 100 m²/gram, or about 60 m²/gram to about 75 m²/gram. Specific examples include about 60 m²/gram, about 80 m²/gram, about 100 m²/gram, about 150 m²/gram, and ranges between any two of these values (including their endpoints).

In some embodiments, the Pd nanoparticles may be disposed on the surface or in a pore channel of the mesoporous $Mn_3O_4$ support, or any combination thereof. In some embodiments, Pd nanoparticles may be uniformly arranged on and/or throughout the support. In some embodiments, the concentration of the Pd nanoparticle disposed or located on the inner surface of the mesoporous $Mn_3O_4$ support is greater than a concentration of the catalyst disposed on the outer surface of the support. In other words, more Pd nanoparticles may be disposed or located within the pores of the support, as compared to the outer surface of the support.

Disclosed herein are methods to convert carbon monoxide (CO) to carbon dioxide ($CO_2$) at low temperatures. In some embodiments, a method of oxidizing CO to $CO_2$ may involve heating a gaseous mixture comprising at least CO and $O_2$ with a catalyst mixture comprising at least Pd and $Mn_3O_4$ at a temperature of about 0° C. to about 60° C., and wherein the CO to $CO_2$ conversion rate is about 40% to about 100%. The Pd/$Mn_3O_4$ catalyst mixture include Pd nanoparticles disposed on the surface and/or in a pore channel of the mesoporous $Mn_3O_4$ support, as described herein. In some embodiments, the gaseous mixture may also include $N_2$, He, $H_2$, Ar, or any combination thereof. Additionally, the gaseous mixture may also contain water, water vapor, moisture, or any combination thereof.

In some embodiments, the CO may be present in the gaseous mixture in an amount of about 1 volume percent to about 10 volume percent, about 1 volume percent to about 8 volume percent, about 1 volume percent to about 6 volume percent, or about 1 volume percent to about 4 volume percent of the gaseous mixture. Specific examples include about 1 volume percent, about 2 volume percent, about 4 volume percent, about 6 volume percent, about 8 volume percent, about 10 volume percent, and ranges between any two of these values (including their endpoints).

The catalysts disclosed herein can function at temperatures at or below 60° C., and can convert CO to $CO_2$ efficiently. In some embodiments, the gaseous mixture may be heated to a temperature of about 20° C. to about 30° C., about 20° C. to about 26° C., about 20° C. to about 25° C., or about 20° C. to about 22° C. Specific examples include about 20° C., about 22° C., about 25° C., about 27° C., about 30° C., and ranges between any two of these values (including their endpoints). When performed at these temperatures, conversion rate of the CO to $CO_2$ is about 60% to about 100%, about 60%, to about 90%, or about 60% to about 75%. In some embodiments, the conversion rate of the CO to $CO_2$ is at least 60%, at least 65%, at least 70%, at least 75%, at least 80%, at least 85%, at least 90%, at least 95%, at least 99%, or 100%.

In some embodiments, the gaseous mixture may be heated to a temperature of about 30° C. to about 60° C., about 30° C. to about 50° C. about 30° C. to about 40° C. or about 30° C. to about 35° C. Specific examples include about 30° C., about 35° C., about 45° C., about 50° C., about 60° C., and ranges between any two of these values (including their endpoints). When performed at these temperatures, conversion rate of the CO to $CO_2$ is about 60% to about 100%, about 60% to about 90%, or about 60% to about 75%. In some embodiments, the conversion rate of the CO to $CO_2$ is at least 60%, at least 65%, at least 70%, at least 75%, at least 80%, at least 85%, at least 90%, at least 95%, at least 99%, or 100%.

In some embodiments, the gaseous mixture may be heated to a temperature of about 0° C. to about 10° C., about 0° C. to about 5° C., about 0° C. to about 3° C., or about 0° C. to about 2° C. Specific examples include about 0° C., about 3° C., about 4° C., about 5° C., about 10° C., and ranges between any two of these values (including their endpoints). When performed at these temperatures, conversion rate of the CO to $CO_2$ is about 40% to about 60%, about 40% to about 50%, or about 40% to about 45%. In some embodiments, the conversion rate of the CO to $CO_2$ is at least 40%, at least 45%, at least 50%, at least 55%, or at least 60%.

In some embodiments, the gaseous mixture may be heated to a temperature of about 0° C. to about 60° C., about 0° C. to about 50° C., about 0° C. to about 30° C., or about 0° C. to about 15° C. Specific examples include about 0° C., about 5° C., about 25° C., about 30° C., about 60° C., and ranges between any two of these values (including their endpoints). When performed at these temperatures, conversion rate of the CO to $CO_2$ is about 40% to about 100%, about 40% to about 90%, about 40% to about 85%, about 40% to about 75%, or about 40% to about 50%. In some embodiments, the conversion rate of the CO to $CO_2$ is at least 40%, at least 50%, at least 60%, at least 75%, at least 80%, at least 85%, at least 90%, at least 95%, at least 99%, or 100%.

Figure 1:
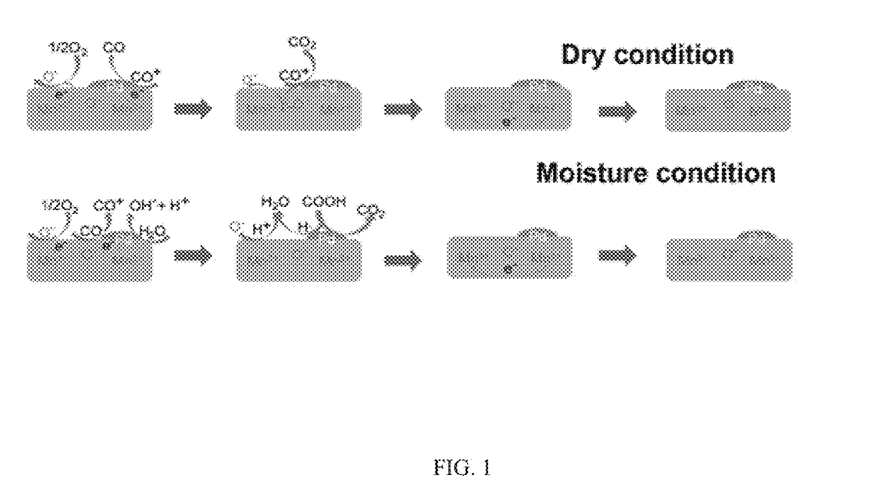
FIG. 1 depicts two possible schematics of the catalytic reactions on a surface of a Pd/$Mn_3O_4$ catalyst according to some embodiments.

In some embodiments, the process of CO to $CO_2$ conversion may also be performed in the presence of water, water vapor, or moisture. In some embodiments, the Pd/$Mn_3O_4$ catalyst mixture described herein may catalyze the CO oxidation more efficiently in the presence of a water molecule. Without wishing to be bound by theory, the Pd may oxidize CO to $CO^+$ species, which then may react with $OH^\ominus$ to form a reactive intermediate COOH. COOH may decompose to $CO_2$ and H. . Further, the $O^\ominus$ species generated by $Mn_3O_4$ support may combine with H· and $H^+$ to form $H_2O$ (FIG. 1). Thus, it is possible that $CO_2$ formation occurs only on the surface of palladium, without contacting $Mn_3O_4$, and preventing the formation of carbonates. Therefore, even in the presence of water, the catalytic activity is not diminished and CO oxidation proceeds.

The CO oxidation process described herein may be performed as a batch process or a continuous flow process. In the batch process, the gaseous mixture comprising CO and $O_2$ is filled in the reactor at the beginning of the action period, after which the reactor is closed for the entire period without adding additional components. In the continuous flow process, the reactor may be filled continuously with fresh gaseous mixture and also emptied continuously. The reactor vessel may be configured to receive the gaseous mixture, the catalyst mixture, or any other reactants separately or in any combination. In a continuous flow process, the gaseous mixture can be in contact with the Pd/$Mn_3O_4$ catalyst mixture at a flow rate of about 40 mL per minute to about 60 mL per minute, about 40 mL per minute to about 50 mL per minute, or about 40 mL per minute to about 45 mL per minute. Further, the flow rate may also depend on the size of the reactor and the volume of the catalyst used.

Larger reactors may allow higher flow rates, and smaller reactors may allow smaller flow rates.

An exemplary continuous flow system may comprise the following: a gas source configured to supply a gaseous mixture, and a reactor configured to contain a volume of catalyst, wherein the catalyst comprises mesoporous Pd/$Mn_3O_4$ as described herein. The reactor may comprise an inlet configured to receive the gaseous mixture such that the gaseous mixture passes through the volume of catalyst, and an outlet configured to allow gaseous mixture that has passed through the volume of catalyst to exit the reactor. Further, the reactor is configured to convert CO to $CO_2$ at a rate of about 40% to about 100% when heated to a temperature of about 0° C. to about 60° C. The reactor may be further connected to a thermoelectric couple, a pressure gauge, a temperature controller, a cooling system, a mechanical stirrer, a plurality of gas valves, or any combination thereof.

The process and the catalysts disclosed herein may be used to remove carbon monoxide from hydrogen-rich gas used for fuel cells, to prevent carbon monoxide poisoning of electrodes. Further, these methods can also be applied for other areas where low-temperature carbon monoxide elimination is required, such as automotive applications, air cleaning systems, for example, carbon monoxide removal at ambient temperatures in tunnels, metro, parking areas, garages, submarines, and also in respiratory protection systems. It can be use for removal of CO in chemical plants, power generation plants, ammonia plants, and during polymerization reactions of hydrocarbons.

EXAMPLES

Example 1

Synthesis of Mesoporous $Mn_3O_4$

About 1.0 gram of poly(ethylene glycol)-poly(propylene glycol)-poly(ethylene glycol) (P-123) and 0.01 mole of $Mn(NO_3)_2$ were added to 10 mL of anhydrous ethanol and vigorously stirred for 60 minutes. The mixture was transferred to an oven and the solvent vas evaporated at 60° C. for 48 hours. The resulting xerogel was calcined at 500° C. for 1 hour to remove the P-123 PEG template.

Example 2

Synthesis of Pd/$Mn_3O_4$ Catalyst

A series of mesoporous $Mn_3O_4$ supported Pd catalysts were synthesized through impregnation and reduction procedures. In a typical synthesis, about 0.5 gram mesoporous $Mn_3O_4$ material of Example 1 was added to 25 mL $Na_2PdCl_4$ solution (at concentrations ranging from $0.1 \times 10^{-4}$-$0.5 \times 10^{-4}$ mM) and stirred for 2 hours. About 100 mL of 0.1 M hydrazine hydrate ($NH_2NH_2 \cdot H_2O$) was added and stirred for 12 hours to obtain a precipitate. The resulting solid mass was collected through centrifugation, washed with water and dried at 60° C. for 24 hours. Examples of catalyst mixtures with various Pd loadings and their physiochemical properties are shown in Table 1.

TABLE 1

| sample | Pd loadings (wt. %) | BET surface area ($m^2$/g) | Average pore diameter (nm) | Pore volume ($cm^3$/g) |
|---|---|---|---|---|
| MP0 | — | 73 | 4.3 | 0.34 |
| MP1 | 1.1 | 84 | 3.3 | 0.33 |
| MP2 | 2.7 | 130 | 2.6 | 0.33 |
| MP3 | 3.2 | 97 | 2.0 | 0.24 |

Example 3

CO Oxidation

The catalytic test for CO oxidation was carried out in a fixed-bed quartz tubular reactor (6 mm) containing 200 milligrams of catalyst samples of Table 1 without any pretreatment. A standard gaseous mixture containing 1.0 vol % CO, 20.0 vol % $O_2$ and 79.0 vol % $N_2$ was used as a source. The feed gas at a flow rate of 50 mL $min^{-1}$ was introduced into the reactor using mass-flow controllers, corresponding to a space velocity of 15000 mL $h^{-1}$ $g^{-1}_{cat}$. After a steady flow of gas for 10 minutes, the activity of catalyst was tested. The conversion of CO was measured by online gas chromatograph (GC) equipped with a flame ionization detector (FID) under steady-state conditions. The reaction temperature was monitored by a thermocouple placed in the middle of the catalyst bed. Conversion of CO was calculated as follows:

Conversion (%)=(Moles of reactant converted/Moles of reactant in feed)×100%

Figure 2:
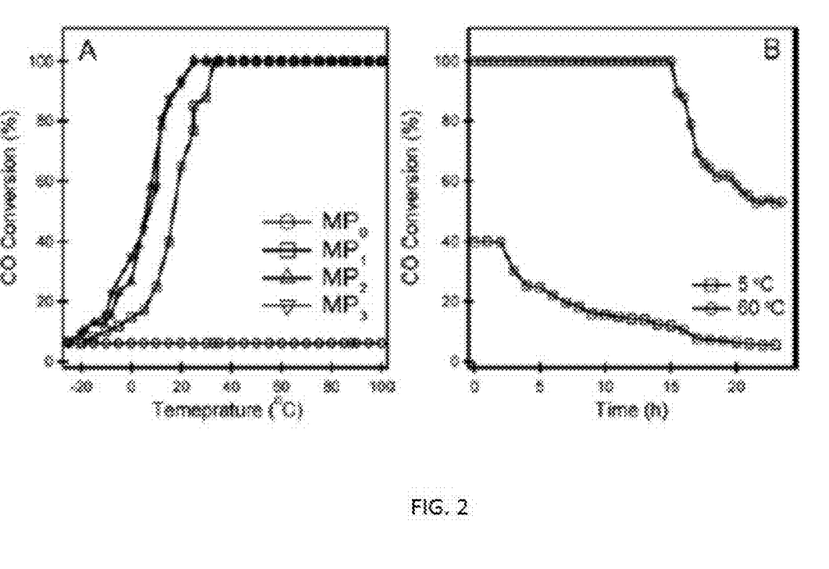
FIG. 2 illustrates catalytic activities of various catalyst mixtures according to an embodiment.

The catalytic performances of various Pd/$Mn_3O_4$ catalysts are shown in FIG. 2A, where the CO conversion is reported as a function of temperature. The mesoporous $Mn_3O_4$ support alone did not show any obvious catalytic activity at any temperature. After incorporation of palladium on the mesoporous support, the catalytic, activity increased greatly. Further, increase in the Pd loading content from 1.1% to 2.7% decreased the $T_{100}$ temperature (temperature at which CO conversion is 100%) from 30° C. to 25° C. Further increase in Pd content to 3.2% did not produce any sequential decrease of the conversion temperature. To measure the intrinsic activity of the catalysts, the turnover frequencies (TOFs) based on surface palladium atoms were also calculated. Compared to other $MnO_x$ supported Pd catalysts, such as Pd/$Mn_2O_3$ and Pd/$MnO_2$, all the samples showed relatively high TOFs at 20° C., and exhibited excellent catalytic activity. The 2.7% Pd loaded $Mn_3O_4$ sample (MP2) gave a TOF value of 0.0637 $s^{-1}$, exhibiting significantly higher catalytic activity than that of 1.1% Pd loaded (MP1, 0.0109 $s^{-1}$) and 3.2% Pd loaded sample (MP3, 0.0534 $s^{-1}$). The turnover frequencies (TOFs) were calculated at 20° C. based on the following definition: TOF ($s^{-1}$)=moles of reactant converted/(moles of total active sites×reaction time).

The 2.7% Pd loaded catalyst (MP2) was further tested at different temperatures for its ability to convert CO to $CO_2$. As shown in FIG. 2B, the $T_{100}$ temperature was about 22° C. and $T_{50}$ temperature (temperature at which CO conversion is 50%) was around 0° C. The catalytic activity of MP2 did not decrease even after 30 hours of reaction.

Example 4

CO Oxidation Under Moist Conditions

Figure 3:
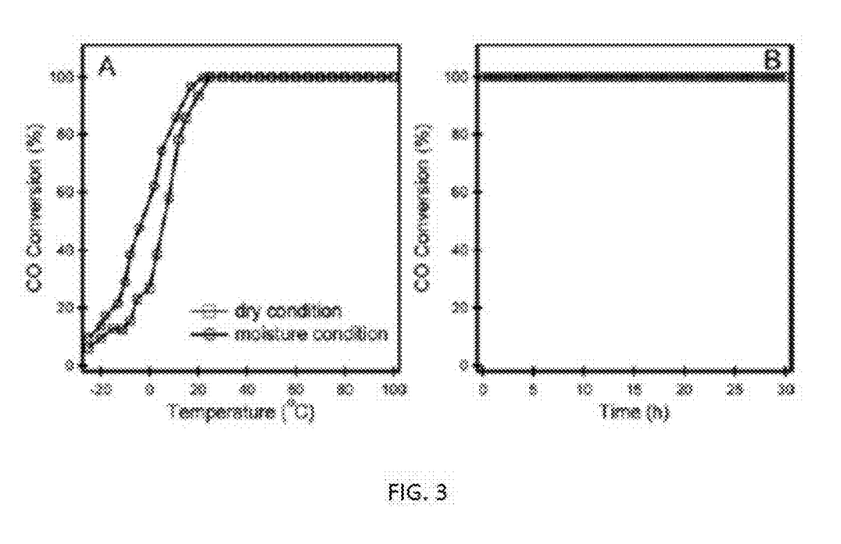
FIG. 3A shows catalytic activity of MP2 under thy conditions (square symbols) and moist conditions (round symbols) according to an embodiment. The x-axis is temperature in ° C., and the y-axis is CO conversion in percent.
FIG. 3B shows stability of catalyst MP2 after prolonged reaction conditions, according to an embodiment. The x-axis is time in hours, and the y-axis is CO conversion in percent.

The catalytic activity (MP2) in the presence of moisture condition was tested as in Example 3 by passing the feed gas of 1% CO at a flow rate of 50 mL min$^{-1}$ through a water vapor saturator directly introduced into the catalyst bed. The water concentration in the feed gas was about 4% by volume. As shown in FIG. 3A, the $T_{100}$ temperature decreased from 25° C. (under dry conditions) to 22° C. (under moist conditions), and the $T_{50}$ temperature was lower than 0° C. Further, there was no change in the catalytic activity of MP2 even after 30 hours, as indicated in FIG. 3B. These studies showed that mesoporous Pd/Mn$_3$O$_4$ catalyst performed much better under moist conditions when compared to dry conditions.

Example 5

Characterization of Mesoporous Pd/Mn$_3$O$_4$ Catalysts

Various Pd/Mn$_3$O$_4$ catalysts were prepared as in Example 2. Powder X-ray diffraction (XRD) patterns were recorded on a Bruker D8 Focus powder diffractometer (Billerica, Mass., USA) with graphite monochromatized Cu Kα radiation (λ=0.15405 nm) operated fit 40 kV. Nitrogen adsorption and desorption isotherms were measured on a Micromeritics ASAP 2020 M analyzer (Norcross, Ga., USA) at liquid nitrogen temperature (77 K). Prior to the measurements, the samples were degassed at 523K in vacuum for 6 hours. The specific surface area and pore size distribution were calculated using the Brunauer-Emmett-Teller (BET) and Barrett-Joyner-Halenda (BJH) methods, respectively.

Figure 4:
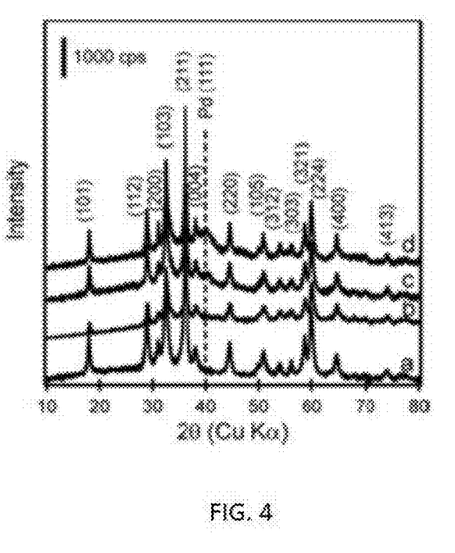
FIG. 4 shows X-ray diffraction pattern of Pd/$Mn_3O_4$ catalysts according to an embodiment; (a) is MP0, (b) is MP1, (c) is MP2, and (d) is MP3. The x-axis is 2Θ (Cu KΘ), and the y-axis is intensity.

The crystalline structures of MP0, MP1, MP2, and MP3 were first characterized by X-ray diffraction (XRD) analysis. FIG. 4 depicts the XRD pattern obtained of the various catalysts. There were no diffraction peaks in the small angle range indicating the disordered pore arrangement. However, a series of sharp and symmetrical Bragg diffraction peaks were observed in the wide angle area, which demonstrated the crystalline feature. All the peaks in the pattern were assigned to the characteristic reflection planes of tetragonal Mn$_3$O$_4$. No additional peaks relating to impurity were found. Besides, the lattice constants, a=5.753 Å and c=9.436 Å, were also in agreement with those of bulk Mn$_3$O$_4$ (PDF card no. 80-0382). When loaded with Pd, a peak emerged at 2θ=40° which could be identified as (111) diffraction bands of face-centered cubic structure palladium (PDF card no. 65-6174). The diffraction intensity increased correspondingly with the increase in loaded Pd content. It should be noted that all the characteristic peaks of metallic Pd were broad and weak, indicating the highly dispersed amorphous or small palladium.

Figure 5:
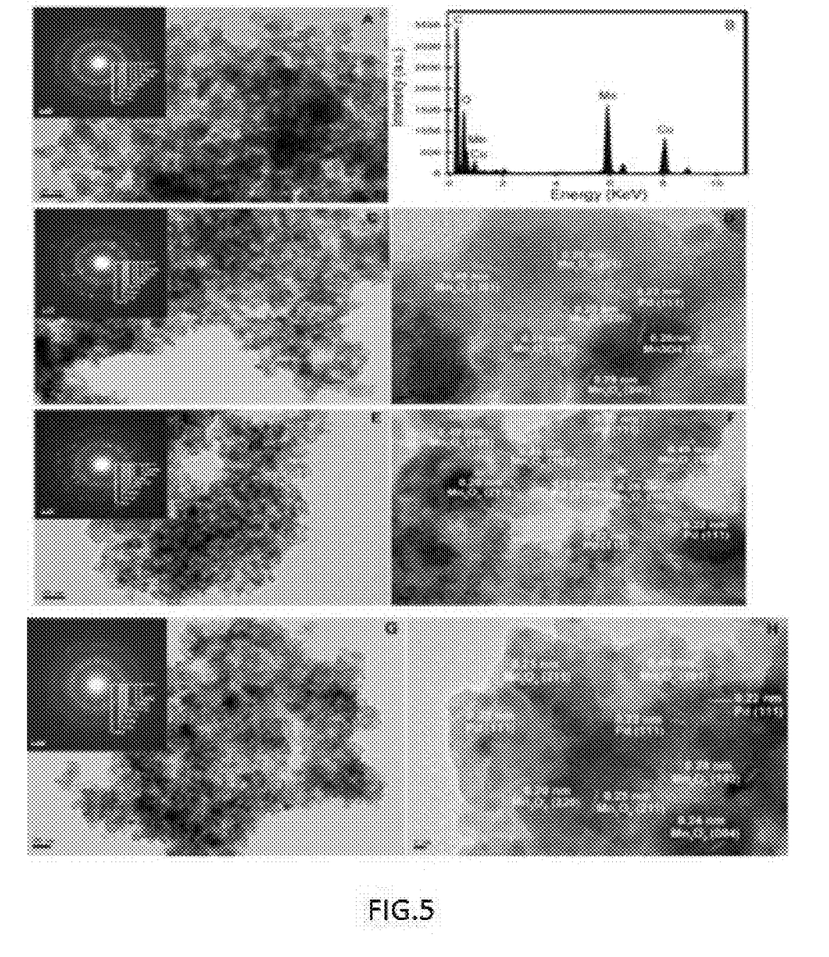
FIG. 5 shows TEM images of Pd/$Mn_3O_4$ catalysts. Inset shows the corresponding SAED patterns. (A) TEM image of MP0; (B) energy diffraction spectra of MP0 (the x-axis is energy (KeV), and the y-axis is intensity (a.u.)); (C) TEM image of MP1; (D) HRTEM image of MP1; (E) TEM image of MP2; (F) HRTEM image of MP2; (G) TEM image of MP3; and (H) HRTEM image of MP3.

Transmission electron microscopy (TEM) observations were performed on a field emission JEM-2100 (JEOL) electron microscope operated at 300 kV and equipped with a Gatan-666 electron energy loss spectrometer and energy dispersive X-ray spectrometer. FIG. 5 shows the TEM results of meso-structured Mn$_3$O$_4$ support and its Pd loading catalysts. All the samples had a porous structure with a pore network inter-sectioned by nanocrystals, and no obvious differences were found between the samples. For Pd loaded catalysts, there were no Pd particles in the image even at 3.2 wt % loadings, suggesting that Pd particles were highly dispersed. The Selected-area-electron diffraction (SAED) patterns from the same area were also imaged. The well-defined diffraction rings for Mn$_3$O$_4$ were observed in all the samples. However, metallic Pd (111) diffraction ring only emerged when Pd loading content was higher than 2.7 wt %. The relatively faint on-again/off-again properties indicated its much tower crystallinity, and agreed with the above XRD results. Further, the High Resolution Transmission Electron microscopy (HRTEM) investigation clearly showed that the catalysts were composed of crystal Mn$_3$O$_4$ and Pd nanoparticles (FIG. 5D, F, H). Nanocrystals with different lattice d-spacing were found all over the image. The d-spacing of Pd crystal was found to be 2.2 Å, and other d-spacing values presented in the images belong to Mn$_3$O$_4$ nanoparticles. The average diameter of Mn$_3$O$_4$ collected from over 10 different particles was 18 nm. Further, the highly dispersed Pd crystals on the Mn$_3$O$_4$ support had an average diameter of lower than 10 nm.

Figure 6:
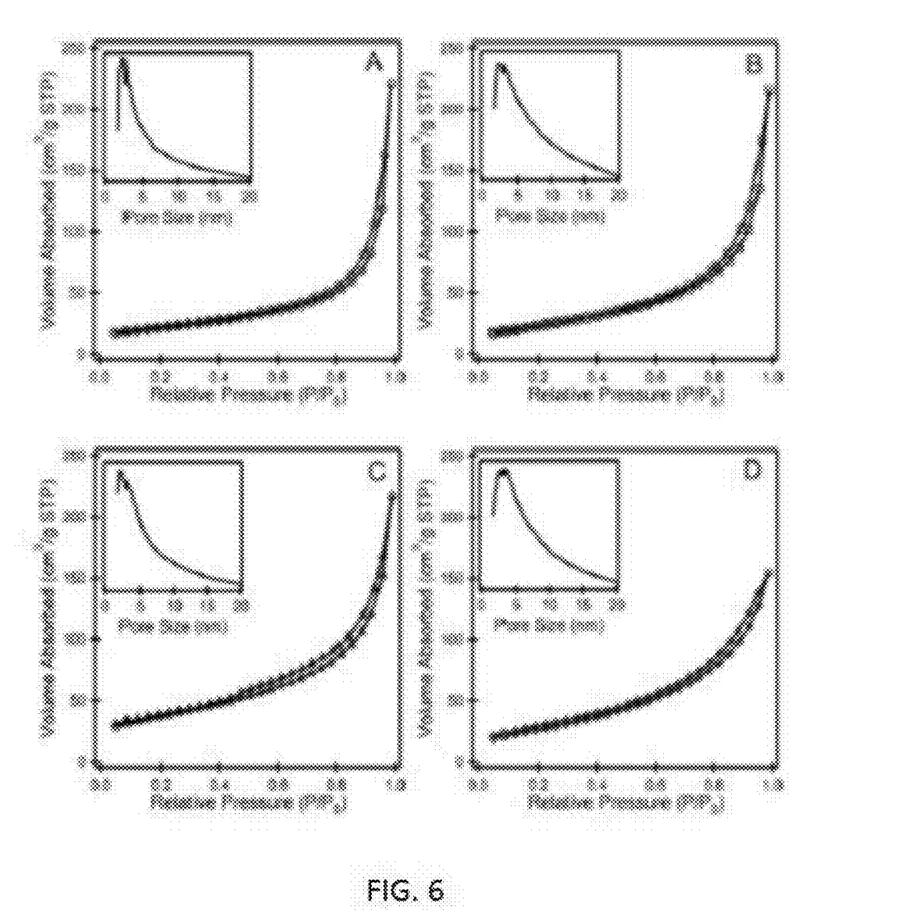
FIG. 6 shows $N_2$ adsorption-desorption isotherms of Pd/$Mn_3O_4$ catalysts before and after the reaction according to an embodiment. Insets show corresponding pore size distributions. (A) is MP0, (B) is MP1, (c) is MP2, and (D) is MP3. The x-axis is relative pressure (P/$P_0$), and the y-axis is volume absorbed ($cm^3$/g STP). The graph insets show the pore size in nm.

The porous structure of the samples were further investigated by measuring adsorption-desorption isotherms of nitrogen at 77 K, as shown in FIG. 6. The pore structure parameters are summarized in Table 1. In all the cases, the typical Langmuir IV isotherms with H3 hysteresis loops were observed and indicated their porous structure and the formation of slit-like mesopores. The mesoporous structure of the Mn$_3$O$_4$ support did not change significantly after impregnation and reduction treatment. However, their specific surface areas increased after loading with palladium. This may be due to the opening of some of the pore channels in the meso-structured Mn$_3$O$_4$ support, when treated with acidic solution of NaPdCl$_4$ during the impregnation and reduction treatment. However, the pore size and pore volume of the Pd/Mn$_3$O$_4$ samples did not change with the increased Pd loading. These results demonstrated that palladium nanoparticles were highly dispersed both inside the pore channels and on the surface of the support.

Figure 7:
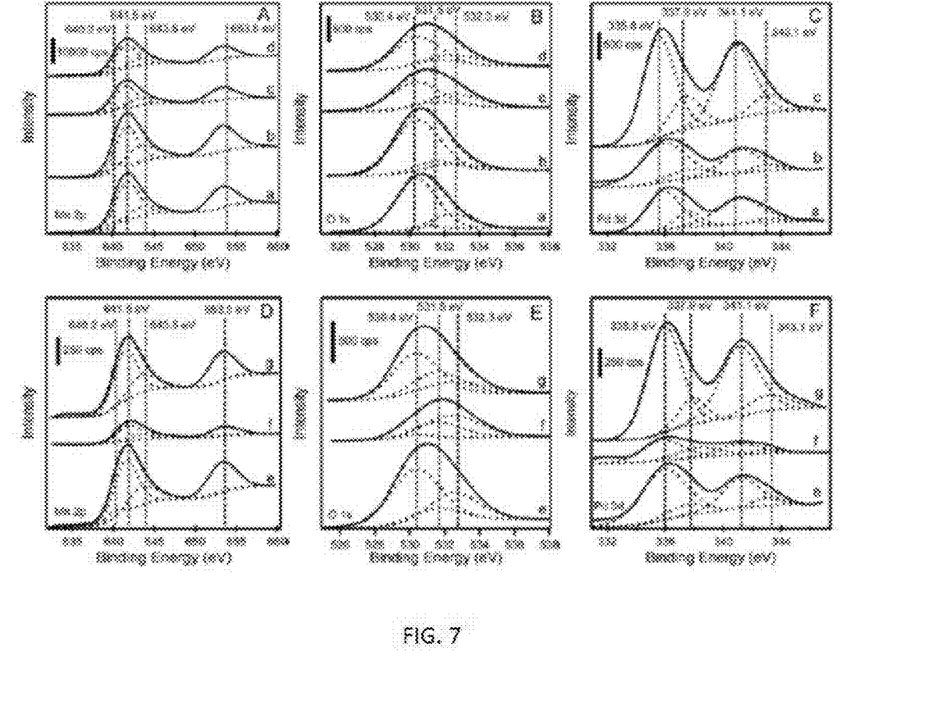
FIG. 7 shows XPS spectra of Pd/$Mn_3O_4$ catalysts before (A, B, C) and after (D, E, F) the reaction according to an embodiment. (a) MP0; (b) MP1; (c) MP2; (d) MP3; (e) fresh MP2 catalyst; (f) MP2 catalyst after CO oxidation under normal conditions; and (g) MP2 catalyst after CO oxidation under moist conditions. The x-axis is binding energy (eV), and the y-axis is intensity.

X-ray photoelectron spectroscopy analysis (XPS) was used to determine surface chemical states of the species for meso-structured Mn$_3$O$_4$ and its Pd loading catalysts. XPS (X-ray photoelectron spectroscopy) signals were collected on a VG Micro MK operated at 200 W. All the elemental binding energies were referenced to the C (1s) line situated at 284.6 eV. As shown in FIG. 7, all the samples exhibited two binding energy levels, at Mn 2p3/2 (642.4 eV) and Mn 2p1/2 (654.0 eV) (FIG. 4A). The resolution of Mn 2p3/2 produced three characteristic peaks at about 640.2 eV, 641.5 eV and 643.5 eV, corresponding to Mn$^{2+}$, Mn$^{3+}$, and Mn$^{4+}$ respectively. The calculated content of different manganese species clearly indicated that the surface manganese were mainly Mn$^{3+}$ and Mn$^{4+}$, and the Mn$^{2+}$ species only occupied about 1%. This may be due to the partial oxidation of surface manganese species when exposed to air. The O 1 s spectra recorded from these support and catalysis are also shown in FIG. 7B. The distribution of oxygen species were estimated by de-convolution, and are depicted in the figure. Two kinds of oxygen species were observed, one at 530.4 eV which is typical of metal-oxygen bonding, and the other at 531.5 eV and 532,3 eV, which are usually associated with the surface adsorbed oxygen. With the increase in Pd loading amount, the lattice O decreased. This may be attributed to the highly dispersed Pd nanoparticles on the Mn$_3$O$_4$ surface. Further, the palladium element showed the typical Pd0 adsorptions at 335.0 and 340.3 eV, corresponding to 3d5/2 and 3d3/2, respectively, with a spin-orbit separation of 4.7 eV. The three Pd/Mn$_3$O$_4$ samples displayed 3d5/2 and 3d/ absorption peaks that were slightly higher than that of Pd0. After curve fitting, the calculated content of Pd0 and Pd$^{2+}$ were about 90% and 10%, respectively. These data clearly confirms that most of the Pd$^{2+}$ ions on the surface are reduced to Pd0 by hydrazine hydrate.

Figure 8:
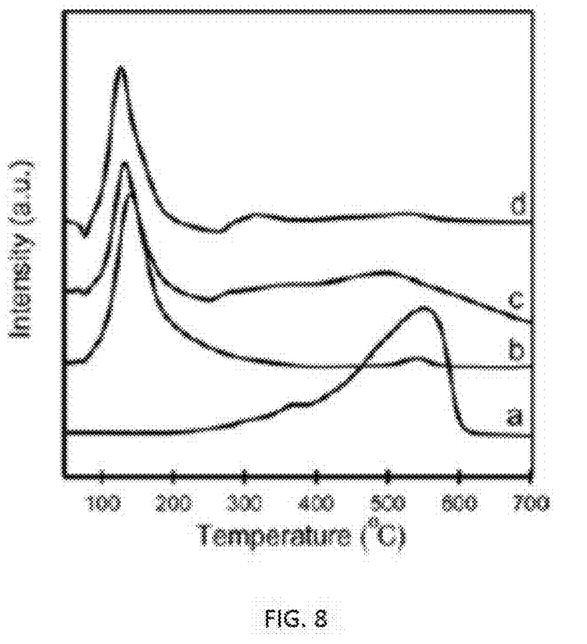
FIG. 8 shows $H_2$-TPR profiles of Pd/$Mn_3O_4$ catalysts according to an embodiment. (a) MP0; (b) MP1; (c) MP2; (d) MP3. The x-axis is temperature (° C.), and the y-axis is intensity (a.u.).

H$_2$-Temperature-Programmed Reduction (H$_2$-TPR) experiments were carried out to investigate the redox properties of various Mn$_3$O$_4$ supported palladium catalysts. H$_2$ temperature-programmed reduction (H$_2$-TPR) analysis was performed by using a Micromeritics Chemisorb 2750 apparatus. For each analysis, accurate amounts of calcined sample (50 milligrams) were purged in a flow of pure argon at 200° C. to remove traces water (heating rate 10° C./minute). After cooling to room temperature, $H_2$-TPR experiments were performed using a 10 vol % $H_2$/Ar mixture at a flow rate of 25 mL/minute. The sample was heated from ambient temperature to 700° C. at heating rate of 10° C./min and $H_2$ consumption was detected by a thermal conductivity detector (TCD). FIG. 8 shows the reduction profiles of the catalysts. For comparison, the TPR profile of the parent $Mn_3O_4$ was also included. It is well documented that the manganese oxides are reduced between 300° C. and 600° C. The meso structured $Mn_3O_4$ support exhibited two reduction peaks, one at 330° C. and the other at 510° C., indicating the stepwise reduction of manganese. Without wishing to be bound by theory, the lower temperature peak may be attributed to the reduction of $Mn^{4+}$ to $Mn^{2+}$, whereas the higher one can be due to the consecutive reduction of $Mn^{3+}$ to $Mn^{2+}$. These results further corroborate the above XPS analysis. When palladium was incorporated, two reduction peaks shifted to lower temperatures. This shift is due to the presence of spillover effect involving either hydrogen activated on the metal phase or mobile lattice oxygen induced by intimate metal-support interactions. The significant low-temperature reduction feature strongly suggests that the manganese oxide is 'activated' to a large extent in the $Pd/Mn_3O_4$ catalyst.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are indented to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would un stand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method to oxidize CO to $CO_2$, the method comprising:
   forming a mesoporous $Mn_3O_4$ support, wherein the forming comprises:
      mixing a triblock copolymer, a manganese salt, and a solvent to form a solution,
      wherein the triblock copolymer is poly(ethyleneglycol)-poly(propyleneglycol)-poly(ethyleneglycol), poly(ethyleneimine)-poly(ethyleneglycol)-poly(ethyleneimine), poly(ethyleneglycol)-polyacetal-poly(ethyleneglycol), polyacetal-poly(ethyleneglycol)-polyacetal, or any combinations thereof;
      evaporating the solution; and
      calcining to form the mesoporous $Mn_3O_4$ support;
   contacting the mesoporous $Mn_3O_4$ support with a Pd compound to form a reaction mixture;
   contacting the reaction mixture with a reducing agent to form a catalyst mixture; isolating the catalyst mixture; and
   contacting a gaseous mixture and the catalyst mixture at a temperature of about 0° C. to about 60° C., wherein the gaseous mixture comprises CO and $O_2$, and wherein the CO is converted to $CO_2$ at a conversion rate of about 40% to about 100%.

2. The method of claim 1, wherein contacting the gaseous mixture and the catalyst mixture comprises contacting with the catalyst mixture that comprises at least one Pd nanoparticle disposed on at least a portion of the mesoporous $Mn_3O_4$ support.

3. The method of claim 1, wherein contacting the gaseous mixture and the catalyst mixture comprises contacting at a temperature of about 20° C. to about 30° C., and wherein the CO is converted to $CO_2$ at a conversion rate of about 80% to about 100%.

4. The method of claim 1, wherein contacting the gaseous mixture and the catalyst mixture comprises contacting at a temperature of about 0° C. to about 10° C., and wherein the CO is converted to $CO_2$ at a conversion rate of about 40% to about 50%.

5. The method of claim 1, wherein contacting the gaseous mixture and the catalyst mixture comprises contacting the gaseous mixture that further comprises $N_2$, He, $H_2$, Ar, or any combination thereof.

6. The method of claim 1, wherein the method comprises a batch process or a continuous flow process.

7. The method of claim 6, wherein contacting the gaseous mixture and the catalyst mixture comprises contacting in the continuous flow process, where the gaseous mixture is in contact with the catalyst mixture at a flow rate of about 40 mL per minute to about 60 mL per minute.

8. The method of claim 1, wherein contacting the gaseous mixture and the catalyst mixture comprises contacting with the catalyst mixture that includes about 1 weight percent to about 5 weight percent of Pd.

9. The method of claim 1, wherein contacting the gaseous mixture and the catalyst mixture comprises contacting with the catalyst mixture that includes the mesoporous $Mn_3O_4$ support having an average pore diameter of about 1 nanometer to about 50 nanometer.

10. The method of claim 1, wherein contacting the gaseous mixture and the catalyst mixture comprises contacting the gaseous mixture that further comprises water.

11. The method of claim 1, wherein contacting the gaseous mixture and the catalyst mixture comprises contacting the gaseous mixture that includes about 1 volume percent to about 10 volume percent CO.

12. A method to make a $Pd/Mn_3O_4$ catalyst, the method comprising:
   forming $Mn_3O_4$ support, wherein the forming comprises:
      mixing a triblock copolymer, a manganese salt, and a solvent to form a solution, wherein the triblock copolymer is poly(ethyleneglycol)-poly(propyleneglycol)-poly(ethyleneglycol), poly(ethyleneimine)-poly(ethyleneglycol)-poly(ethyleneimine), poly(ethyleneglycol)-polyacetal-poly(ethyleneglycol), polyacetal-poly(ethyleneglycol)-polyacetal, or any combinations thereof;
      evaporating the solution; and
      calcining to form the $Mn_3O_4$ support,
   contacting the $Mn_3O_4$ support with a Pd compound to form a reaction mixture, contacting the reaction mixture with a reducing agent to form a precipitate, and isolating the precipitate.

13. The method of claim 12, wherein contacting the $Mn_3O_4$ support with the Pd compound comprises contacting a mesoporous $Mn_3O_4$ support.

14. The method of claim 12, wherein mixing the triblock copolymer, the manganese salt, and the solvent comprises mixing the manganese salt selected from the group consisting of $Mn(NO_3)_2$, $MnCl_2$, $MnBr_2$, $MnF_2$, $MnPO_4$, $MnSO_4$, or any combination thereof.

15. The method of claim 12, wherein evaporating the solution comprises heating the solution to a temperature of about 50° C. to about 80° C. for about 24 hours to about 96 hours.

16. The method of claim 12, wherein calcining the $Mn_3O_4$ support comprises heating the $Mn_3O_4$ support to a temperature of about 300° C. to about 600° C. for about 30 minutes to about 6 hours.

17. The method of claim 12, wherein contacting the $Mn_3O_4$ support with the Pd compound comprises contacting with $Na_2PdCl_4$, $H_2PdCl_4$, $K_2PdCl_4$, $(NH_4)_2PdCl_4$, $Pd(CH_3COO)_2$, $Pd(NO_3)_2$, $PdSO_4$, or any combination thereof.

18. The method of claim 12, wherein contacting with the reducing agent comprises contacting with hydrazine, $NaBH_4$, $KBH_4$, or any combination thereof.

19. The method of claim 12, wherein isolating the precipitate comprises removing the precipitate from the reaction mixture by centrifugation, filtration, distillation, decantation, or any combination thereof.

* * * * *